Aug. 18, 1931.     J. ROBINSON     1,819,387
AUTOMATIC TRAIN PIPE CONNECTER
Original Filed April 1, 1921

INVENTOR
Joseph Robinson
BY
Walton, Coit, Morse & Grindle
ATTORNEYS

Patented Aug. 18, 1931

1,819,387

UNITED STATES PATENT OFFICE

JOSEPH ROBINSON, OF NEW YORK, N. Y.

AUTOMATIC TRAIN PIPE CONNECTER

Refiled for abandoned application Serial No. 460,436, filed April 1, 1921. This application filed December 28, 1927. Serial No. 243,129.

My invention relates to improvements in automatic train pipe connecters, and particularly to the provision of an improved interchange device for coupling a car equipped with the automatic connecter into interchange communication with a car not so equipped. Another object is to provide an interchange device for this purpose by which the gaskets between the faces of mated connecter heads may be removed while the heads remain coupled. In freight service especially it is very desirable that the automatic connecter be equipped with means for effecting immediate connection to a car not equipped therewith. Heretofore this means has usually been constructed separately of the connecter and carried at some point on the car far removed from the connecter, necessitating that the trainmen spend considerable time procuring the device before connection can be made from a car equipped with the connecter to one not so. It is also essential that the automatic connecter, especially in freight service, shall be capable of ready inspection and maintenance particularly as respects the gaskets by which the joint is formed. To separate the cars in order to get at the gaskets between the faces of the mated connecter heads is both expensive and objectionably slow.

The present application is a substitute for applicant's prior abandoned application Serial No. 460,436, filed April 1, 1921.

My invention resides in, and I attain the foregoing objects, by the mechanism illustrated in the accompanying drawings, in which.

Figures 1, 2:
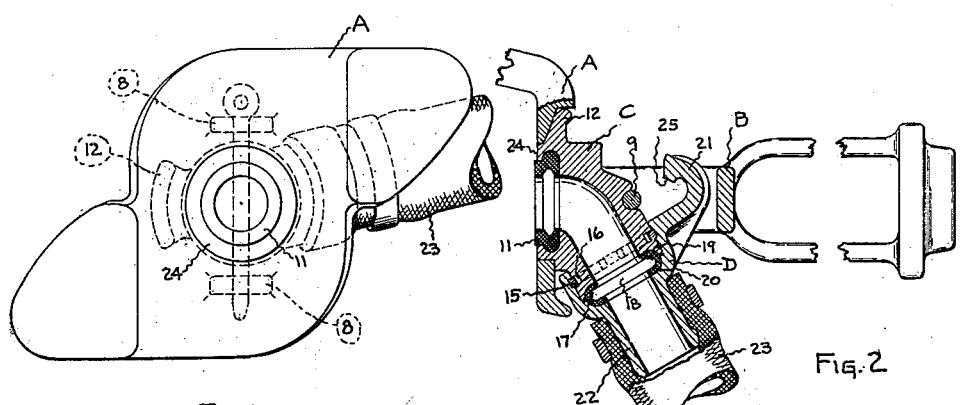
Figure 1 is a front elevation of an automatic connecter head provided with my improvement.
Figure 2 is a sectional plan view thereof. In this view the rear end of the shank B is shown in elevation.

Referring now to the drawings: I provide any suitable form of coupling head A with a centrally located opening spanned by the walls 7 and 8 of the shank or body member B as shown particularly in Figure 1, the body member being cast integral with the head or otherwise connected thereto as desired. Projecting through the opening in the head and positioned between walls 7 and 8 of the member B I mount my interchange and gasket renewing device, and removably maintain it in such position by a pin, or other suitable locking device 9 adapted to be inserted downwardly in the walls 7 and 8 and into the seat 10 of the rear face of my improved interchange device, to securely lock the same in position. The pin 9 is, of course, adapted to be readily removed when it is desired to extract my improved interchange from the opening in the coupling head A. A head member or part C rotatably mounted in a shank or heel member D, comprises my improved interchange and gasket renewing device. The head C carries any desired form of gasket 11 adapted normally to rest in the plane of the coupling face of the head A, and is provided with a toe or lip 12 adapted to mate with the heel 13 of the well known standard hand operated hose coupling 14, shown particularly in Figure 3. The rear end of the head member C extends into a centrally located socket or opening in the heel member D, and is secured therein by a suitable ring, or other device, 15 which is adapted to expand into a circumferential groove 16 formed in part in the head member C, as shown at especially Figure 2.

As aforesaid, the head member C is rotatably mounted in the heel member D, a gasket 17 being inserted between the head member and the bottom of the opening in the heel member to seal the joint therebetween. The gasket is provided with an interior annular groove 18 adapted to admit the fluid thereto whereby the gasket 17 is expanded into tight engagement with its seats 19 and 20 on the head member and on the heel respectively. A heel or overhanging projection 21 extends from the body of the heel member D and is preferably formed integral therewith, but may, of course, be otherwise secured thereto, or to the head member C if desired, as indicated, for instance, in Figure 5. A rearwardly extending shank 22 constitutes a part of the heel member D and serves to receive the usual train pipe hose 23.

Figure 3:
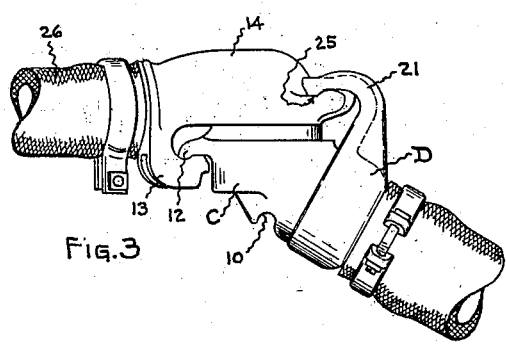
Figure 3 is a plan view showing my improved interchange device connected with a standard form of hand operated hose coupling carried in the hose of an unequipped car.
Figure 4:
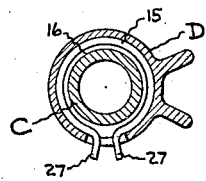
Figure 4 is a sectional detail of Figure 2 showing the spring device for maintaining the head C of my improved interchange in its bearing in the heel member D.

When it is desired to make interchange between a car equipped with an automatic connecter having my improvement, and a car not equipped therewith, the pin 9 is extracted and my improvement is removed from the coupling head A, whereupon the head member C is rotated approximately 180° to bring its coupling face 24 adjacent the coupling face 25 of the heel member D, and is then coupled into the standard hand operated hose coupling 14 in the hose 26 of the unequipped car, as clearly shown in Figure 3. Such rotation of the member C is necessitated by the fact that when mounted in the head, the coupling face 24 thereof must face forwardly, but as is well known, the face of the ordinary hand hose coupling, when mounted on a car, is turned rearwardly toward the car on which it is mounted, or at least, faces transversely of the longitudinal axis of the car. Therefore, in order to get the coupling face in position to abut against the face of the ordinary hand hose coupling, it is necessary to rotate the same into substantially the position shown in Figure 3. To re-mount my improvement in the coupling head A it is but necessary to retrace this operation. When it is desired to remove a defective gasket 11 from between the heads A of mated connecters, without first uncoupling the heads, the pin 9 is extracted and my improvement is removed from one or both of the heads carrying with it the gasket 11 whereupon the gasket may be inspected and replaced by retracing this operation. The gasket 17 is removed, in case renewal is necessary, by gripping the ends 27 of the ring 15 thereby contracting the ring into the recess in the head member C, permitting the parts to be separated and the gasket to be extracted. In like manner, with the necessary variations, these parts are re-assembled.

Figure 5:
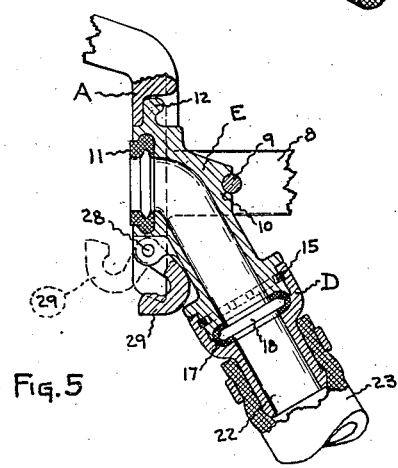
Figure 5 is a sectional plan view showing a modification of my improvement.
Figure 6:
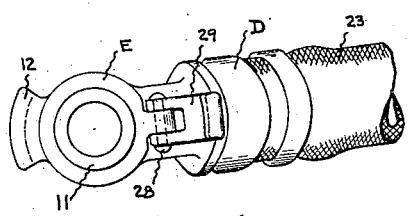
Figure 6 is a face view of the coupling E shown in Figure 5.

In Figures 5 and 6 I have shown a modification of my improvement in which the heel device 21, shown in Figures 2 and 3, is pivotally mounted on the head member as at 28. With this form of device interchange is effected by extracting the pin 9 and removing the interchange from the connecter head whereupon the pivoted heel 29 is rotated forward as indicated by dotted lines in Figure 5. The head E is then rotated one half turn to bring it into position to be coupled with the standard coupling 14—Figure 3—in the hose 26 of the unequipped car, the head E being rotatably mounted with respect to the hose 23, the union or swivel joint shown in Figure 2 being employed to permit of this operation, as illustrated.

Detailed variations or refinements may, of course, be made in my improvement without departing from the scope of my invention and I therefore desire not to be limited to the particular construction disclosed.

Having thus described the invention, what is claimed as new and desired to be secured by Letters Patent is:

1. A coupling device adapted to connect the hose on a railway car to an automatic connecter head on said car or to a hose provided with a conventional type of railway hand hose coupling, said device comprising a tubular member secured to the end of said hose, a second tubular member arranged in line with and rotatably connected to said first member, said second member having a flat face thereon surrounding the open end of the bore therein, said face being arranged obliquely to the axis of rotation of said second tubular member.

2. A coupling device adapted to connect the hose on a railway car to an automatic connecter head on said car or to a hose provided with a conventional type of railway hand hose coupling, said device comprising a tubular member secured to the end of said hose, a second tubular member arranged in line with and rotatably connected to said first member, the bore in said second tubular member being curved laterally at the outer end thereof, said second member having a flat face thereon surrounding the outer end of said bore, said face being arranged obliquely to the axis of rotation of said second member.

In testimony whereof I hereunto affix my signature.

JOSEPH ROBINSON.